United States Patent
Wong

(10) Patent No.: US 10,114,168 B2
(45) Date of Patent: Oct. 30, 2018

(54) LIGHT GUIDE PLATE, BACKLIGHT MODULE AND DISPLAY APPARATUS

(71) Applicant: ChengFeng Optronics Corporation, Taichung (TW)

(72) Inventor: Ching-Fang Wong, Taichung (TW)

(73) Assignee: ChengFeng Optronics Corporation, Taichung (TW)

( * ) Notice: Subject to any disclaimer, the term of this patent is extended or adjusted under 35 U.S.C. 154(b) by 0 days.

(21) Appl. No.: 15/468,121

(22) Filed: Mar. 24, 2017

(65) Prior Publication Data
US 2017/0307805 A1    Oct. 26, 2017

(30) Foreign Application Priority Data

Apr. 21, 2016  (TW) ................. 105112456 A

(51) Int. Cl.
*G02B 6/028* (2006.01)
*F21V 8/00* (2006.01)

(52) U.S. Cl.
CPC ........... *G02B 6/0055* (2013.01); *G02B 6/005* (2013.01); *G02B 6/0088* (2013.01)

(58) Field of Classification Search
CPC ..... G02B 6/005; G02B 6/0055; G02B 6/0088
USPC ....................... 362/606, 624, 625
See application file for complete search history.

(56) References Cited

U.S. PATENT DOCUMENTS

2015/0346416 A1* 12/2015 Wolk ................. G02B 6/005
                                                            362/606
2016/0097895 A1*  4/2016 Wolk ................. G02B 6/0036
                                                            362/611

FOREIGN PATENT DOCUMENTS

TW        M409435        8/2011

OTHER PUBLICATIONS

"Office Action of Taiwan Counterpart Application," dated Apr. 13, 2017, p. 1-p. 8.

* cited by examiner

*Primary Examiner* — Evan Dzierzynski
*Assistant Examiner* — Keith G Delahoussaye
(74) *Attorney, Agent, or Firm* — JCIPRNET

(57) ABSTRACT

A light guide plate including a light guide main body and an index matching layer is provided. The light guide main body has a light-emitting surface and a bottom surface opposite to the light-emitting surface. The index matching layer is disposed adjacent to the bottom surface, wherein a refractive index of the light guide main body is n1, and a refractive index of the index matching layer is n2. $1.07*n2 \leq n1 \leq 1.7*n2$, and $0.1 \leq (n1-n2) \leq 0.7$. A thickness of the index matching layer is larger than 500 nm. A backlight module and a display apparatus are also provided.

20 Claims, 6 Drawing Sheets

LIGHT GUIDE PLATE, BACKLIGHT MODULE AND DISPLAY APPARATUS

CROSS-REFERENCE TO RELATED APPLICATION

This application claims the priority benefit of Taiwan application serial no. 105112456, filed on Apr. 21, 2016. The entirety of the above-mentioned patent application is hereby incorporated by reference herein and made a part of this specification.

BACKGROUND OF THE INVENTION

Field of the Invention

The invention is related to an optical device, an optical module and an electronic apparatus, and particularly to a light guide plate, a backlight module and a display apparatus.

Description of Related Art

Generally speaking, a backlight module can be classified into a direct-type backlight module and an edge-lit type backlight module. The edge-lit type backlight module generally includes a light source and a light guide plate, wherein the light source is disposed on a side of the light guide plate. After a light beam emitted from the light source is incident into the light guide plate from the side of the light guide plate, the light beam is transmitted in the light guide plate via total internal reflection. As compared to the direct-type backlight module, the edge-lit type backlight module can reduce the amount of light-emitting devices used for the light source and therefore has the advantage of low consumption of electricity. However, existing edge-lit type backlight module still has problems such as color shift or insufficient structural strength of light guide plate, and such problems cause negative consequence to the illumination quality of the backlight module, which further affects the display quality of the display apparatus that adopts the edge-lit type backlight module.

SUMMARY OF THE INVENTION

The invention provides a light guide plate which facilitates generation of total internal reflection or helps to enhance structural strength.

The invention provides a backlight module which has good illumination quality.

The invention provides a display apparatus which has good display quality.

In an embodiment of the invention, a light guide plate includes a light guide main body and an index matching layer. The light guide main body has a light-emitting surface and a bottom surface opposite to the light-emitting surface. The index matching layer is disposed adjacent to the bottom surface, wherein a refractive index of the light guide main body is n1, and a refractive index of the index matching layer is n2. $1.07*n2 \leq n1 \leq 1.7*n2$, and $0.1 \leq (n1-n2) \leq 0.7$. A thickness of the index matching layer is larger than 500 nm.

In an embodiment of the invention, a backlight module includes a light guide plate, a light source and a reflective sheet. The light guide plate includes a light guide main body and an index matching layer. The light guide main body has a light-emitting surface, a bottom surface opposite to the light emitting surface and a light-incident surface connecting the light-emitting surface and the bottom surface. The index matching layer is disposed adjacent to the bottom surface, and the index matching layer is disposed between the reflective sheet and the light guide main body, wherein a refractive index of the light guide main body is n1, and a refractive index of the index matching layer is n2. $1.07*n2 \leq n1 \leq 1.7*n2$, and $0.1 \leq (n1-n2) \leq 0.7$. A thickness of the index matching layer is larger than 500 nm. The light source is disposed next to the light-incident surface.

In an embodiment of the invention, a display apparatus includes the backlight module and a display panel, wherein the display panel is disposed adjacent to the light-emitting surface.

Based on the above, the embodiments of the invention have at least one of the following advantages or effects. In the light guide plate in the embodiments of the invention, the refractive index difference between the light guide main body and the index matching layer cooperates with the thickness of the index matching layer to help generation of total internal reflection. In an embodiment, the index matching layer may be configured to support the light guide main body, thereby reinforcing the structural strength of the light guide plate. In addition, the backlight module in the embodiments of the invention uses the above-mentioned light guide plate and thus has good illumination quality. The display apparatus in the embodiments of the invention uses the above-mentioned backlight module and thus has good display quality.

In order to make the aforementioned features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF EMBODIMENTS

Figure 1:
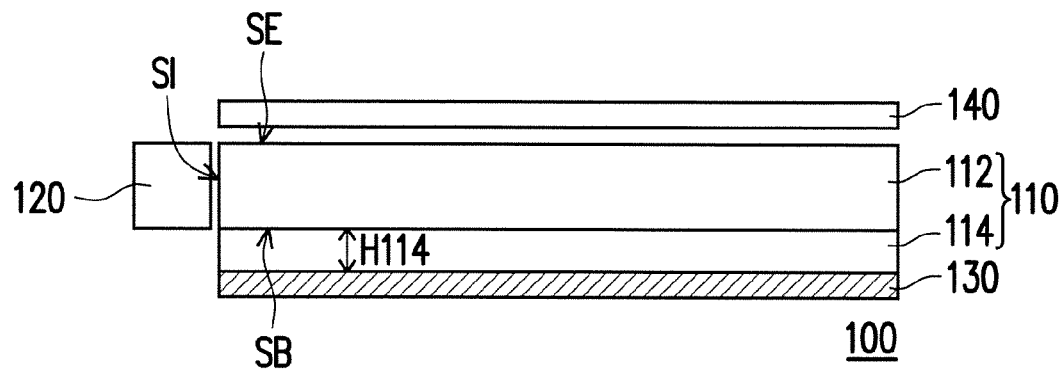
FIG. 1 is a cross-sectional view illustrating a backlight module according to the first embodiment of the invention.

FIG. 1 is a cross-sectional view illustrating a backlight module according to the first embodiment of the invention.

Figure 2A:
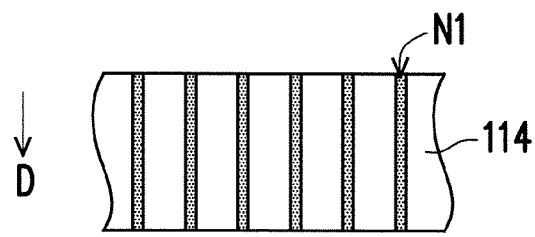
FIGS. 2A to 2C respectively illustrate the first to the third partial enlargement views of an index matching layer in FIG. 1.
Figure 2B:
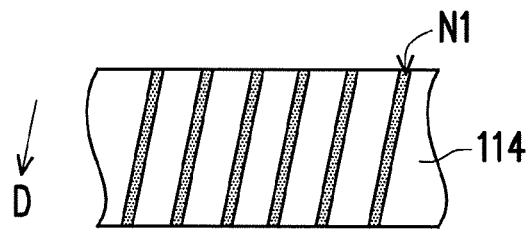
Figure 2C:
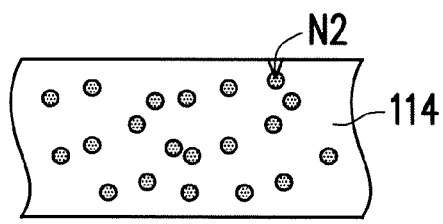

FIGS. 2A to 2C respectively illustrate the first to the third partial enlargement views of an index matching layer in FIG. 1.

Referring to FIG. 1, a backlight module 100 includes a light guide plate 110, a light source 120 and a reflective sheet 130. The light guide plate 110 includes a light guide main body 112 and an index matching layer 114. The light guide main body 112 has a light-emitting surface SE, a bottom surface SB and a light-incident surface SI, wherein the bottom surface SB is opposite to the light-emitting surface SE, and the light-incident surface SI connects the light-emitting surface SE and the bottom surface SB. A plurality of light guide micro-structures or a plurality of dots may be formed on at least one of the light-emitting surface SE and bottom surface SB of the light guide main body 112, which should not be construed as limitation to the invention.

The index matching layer 114 is disposed adjacent to the bottom surface SB, and also disposed between the reflective sheet 130 and light guide main body 112. In the embodiment, the index matching layer 114 is formed on the bottom surface SB of the light guide main body 112 so that the bottom surface SB is disposed between the index matching layer 114 and light-emitting surface SE.

A material of the index matching layer 114 may include an insulating material or metal oxide. When the material of the index matching layer 114 is selected from an inorganic insulating material (e.g. silicon oxide) or a metal oxide (e.g. indium tin oxide), the index matching layer 114 may be formed on the bottom surface SB via deposition, and the index matching layer 114 may have a plurality of nano-columnar voids N1. Referring to FIGS. 1 to 2B, the nano-columnar voids N1 are distributed in the index matching layer 114, wherein each nano-columnar void N1 may extend outward from the bottom surface SB of the light guide main body 112, and an extending direction D of each nano-columnar void N1 may be perpendicular to the bottom surface SB (see FIG. 2A) or inclined to the bottom surface SB (see FIG. 2B). The refractive index of the index matching layer 114 is related to parameters such as the inclination angle, width, porosity and arrangement of the nano-columnar voids N1. In FIGS. 2A and 2B, the nano-columnar voids N1 are respectively arranged at intervals, which should not be construed as a limitation to the invention.

When the material of the index matching layer 114 is selected from an organic insulating material (e.g. polymer material), the index matching layer 114 may be formed on the bottom surface SB via coating, and the index matching layer 114 may have a plurality of nano-holes N2. Referring to FIGS. 1 and 2C, the nano-holes N2 are dispersed in the polymer material, and the refractive index of index matching layer 114 is related to parameters such as the dimension, distribution and porosity of nano-holes N2. In addition, the index matching layer 114 may be formed of a material having less refractive index than that of the light guide main body 112, such as magnesium fluoride ($MgF_2$), polytetrafluoroethene (i.e. Teflon) or optical adhesive with low refractive index and so on.

Figure 3:
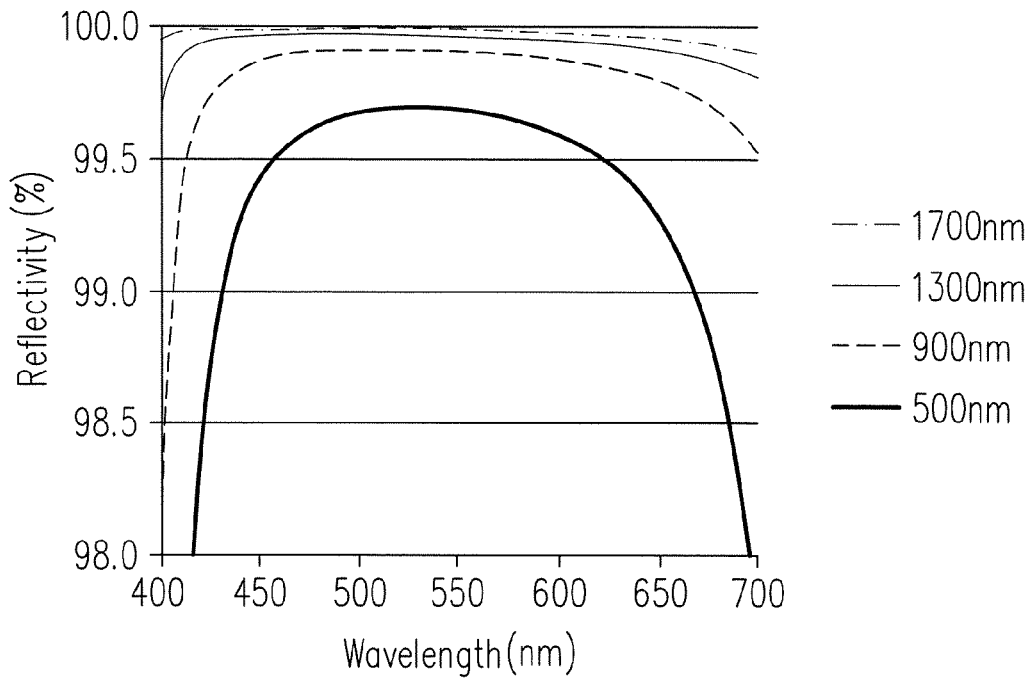
FIGS. 3 to 4 are respective relationship views of the thickness of index matching layer and reflectivity of visible light under various refractive index differences.
Figure 4:
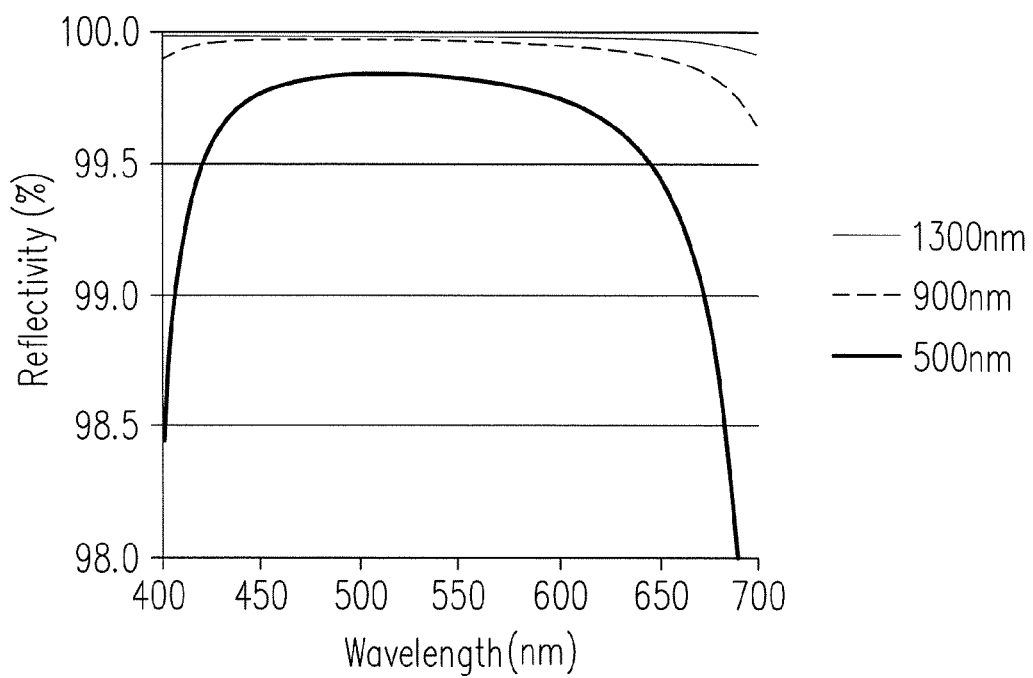

FIGS. 3 and 4 are incorporated below to describe how the reflectivity of the backlight module 100 is affected by the refractive index difference between the light guide main body 112 and index matching layer 114 and a thickness H114 of the index matching layer 114. FIGS. 3 to 4 are respective relationship views of the thickness of the index matching layer and reflectivity of visible light under various refractive index differences. In FIG. 3, the refractive index difference between the light guide main body 112 and index matching layer 114 is 0.14, while the refractive index difference between the light guide main body 112 and index matching layer 114 in FIG. 4 is 0.32. It should be pointed out that the reflectivity in respective FIGS. 3 and 4 are simulation results under the circumstances where an incident angle is greater than a critical angle.

In the light guide main body 112, when the incident angle is greater than critical angle, a total internal reflection occurs. Theoretically, the reflectivity of visible light (wavelength of 400 nm to 700 nm) is close to 100%. However, practically, when the index matching layer 114 is extremely thin, film interference is likely to occur and the film interference would destroy total internal reflection. As shown in FIGS. 3 and 4, even when the incident angle is greater than the critical angle, if the thickness H114 of the index matching layer 114 is insufficient, the reflectivity of visible light waveband may vary considerably, which causes the problem of color shift. In addition, the insufficiency of thickness H114 causes the light wave larger than critical angle unable to be effectively transmitted to a rear end of the light guide main body 112 away from the light-incident surface SI due to reduction of total light wave in total internal reflection.

Comparison between FIG. 3 and FIG. 4 shows that the greater the refractive index difference between the light guide main body 112 and index matching layer 114, the less the thickness H114 of the index matching layer 114 required for generating total internal reflection. In other words, the cooperation between modulation of the refractive index difference between the light guide main body 112 and index matching layer 114 and the thickness H114 of the index matching layer 114 helps generation of total internal reflection. Specifically, if the refractive index of light guide main body 112 is n1, and the refractive index of the index matching layer 114 is n2, under the condition of $1.07*n2 \le n1 \le 1.7*n2$ and $0.1 \le (n1-n2) \le 0.7$, the thickness H114 of index matching layer 114 needs to be greater than 500 nm.

Under the structure of FIG. 1, $1.5 \le n1 \le 1.7$ and $1.0 < n2 \le 1.4$, wherein the light guide main body 112 may be glass, polymethylmethacrylate (PMMA) or polycarbonate (PC), which should not be construed as a limitation to the invention. The index matching layer 114 may adopt the forms as illustrated in FIG. 2A to FIG. 2C, and the refractive index of index matching layer 114 can be modulated by changing porosity, which should not be construed as a limitation to the invention. Considering the refractive index range and structural strength of the index matching layer 114, the porosity of the index matching layer 114 is preferably in a range of 5% or more and 95% or less. Within this range, the index matching layer 114 not only can facilitate generation of total internal reflection, but also can support the light guide main body 112, thereby improving the structural strength of light guide plate 110 and solving the phenomenon of rainbow stripes caused by insufficient structural strength in conventional large-sized backlight module so that the backlight module 100 has good illumination quality. When the index matching layer 114 is an optical adhesive (e.g. OCA) having low refractive index and the light guide main body 112 is glass, the light guide main body 112 attached to the reflective sheet 130 via the optical adhesive of low refractive index can function similarly as an explosion-proof membrane, thereby improving the strength of mechanism.

Referring to FIG. 1, the light source 120 is disposed next to the light-incident surface SI which is adapted to provide a light beam (not shown). The light beam enters the light guide main body 112 via the light-incident surface SI and is transmitted in the light guide main body 112 via total internal reflection. The light guide micro-structure or dots (not shown) disposed on the bottom surface SB of the light guide main body 112 may enable a portion of the light beam to be scattered so that the light beam is emitted from the light emitting surface SE of the light guide main body 112 and form a surface light source required for illumination. The light source 120 may include a lamp tube or a plurality of light emitting diodes, wherein an extending direction of the lamp tube or arrangement direction of the light emitting diodes is parallel with the light-incident surface SI (i.e. perpendicular to the drawing).

The reflective sheet 130 is disposed at one side of the index matching layer 114 away from the light guide main body 112, which is adapted to reflect the light beam of light guide main body 112 emitted from the bottom surface SB so that it is possible for the light beam to return to the light guide main body 112, thereby improving utilization of light. For example, the reflective sheet 130 may be a metal reflective sheet or white reflective sheet. The metal reflective sheet is, for example, a silver reflective sheet or an aluminum reflective sheet, which should not be construed as a limitation to the invention. In the embodiment, the reflective sheet 130 may be formed on the surface of the index matching layer 114 away from the light guide main body 112 via deposition or coating, which should not be construed as a limitation to the invention.

To meet different design requirements, the backlight module 100 may further include other elements. For example, the backlight module 100 may further include at least one optical film 140. The optical film 140 is disposed above the light-emitting surface SE of the light guide main body 112 and may include at least one of a diffuser and a prism sheet, which should not be construed as a limitation to the invention.

Figure 7:
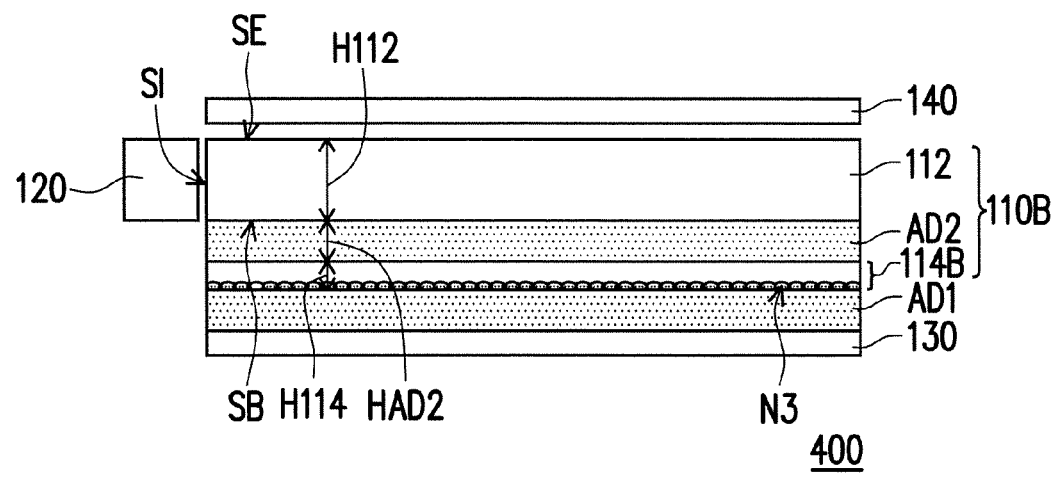
Figure 8:
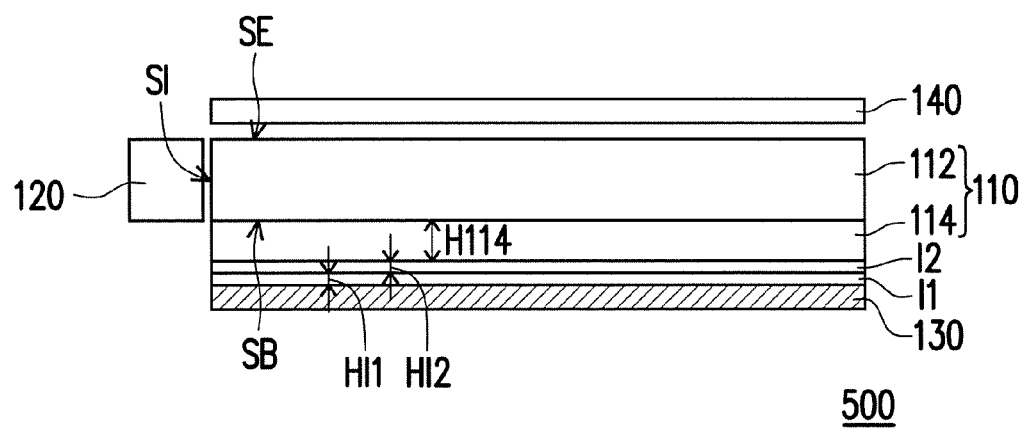
Figure 9:
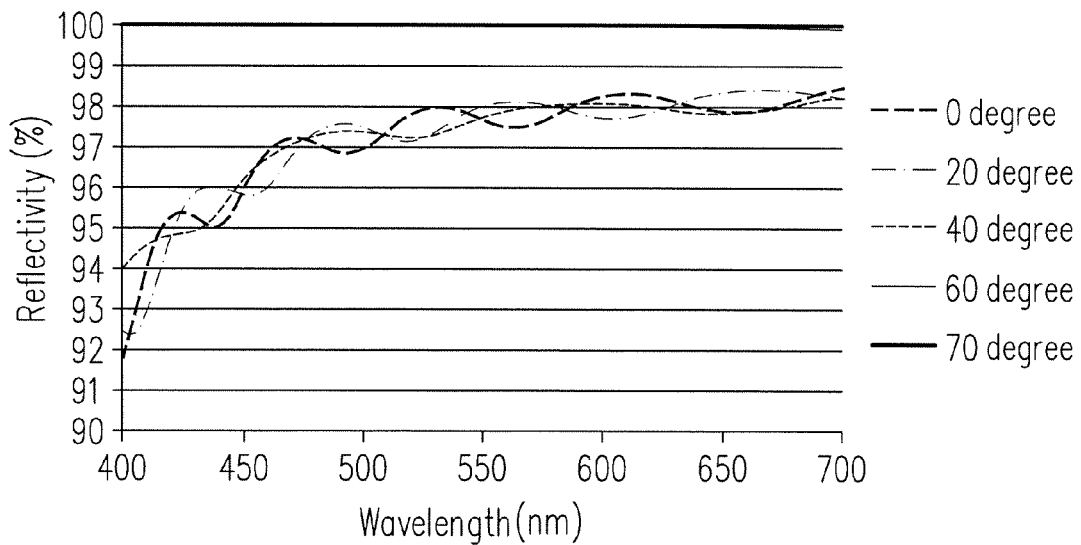
FIGS. 9 and 10 respectively show simulation results of the reflectivity of a backlight module under the condition where a light guide main body is only provided with an index matching layer and the condition where the light guide main body is provided with an index matching layer, a first refractive index layer and a second refractive index layer.
Figure 10:
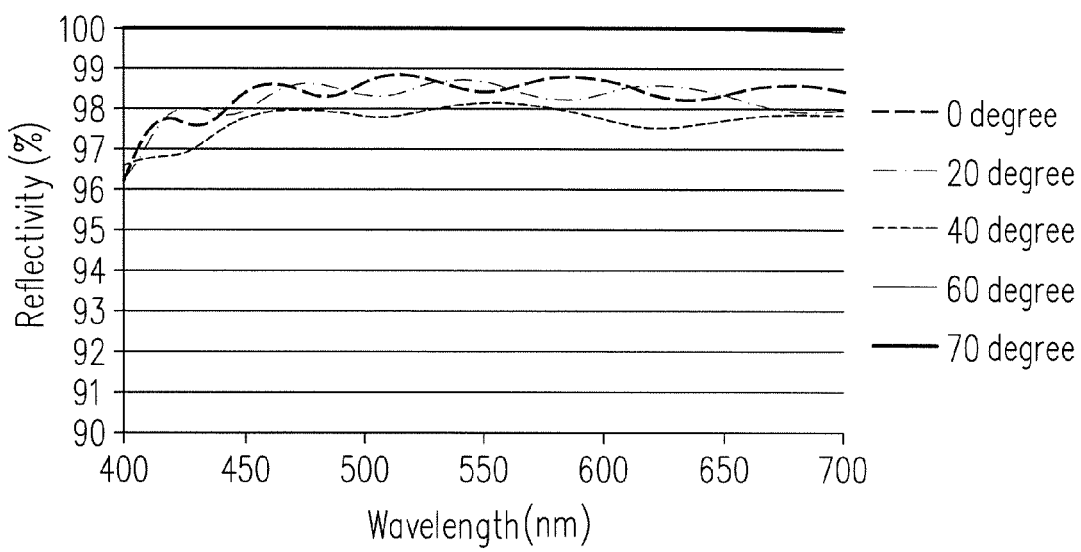
Figure 11:
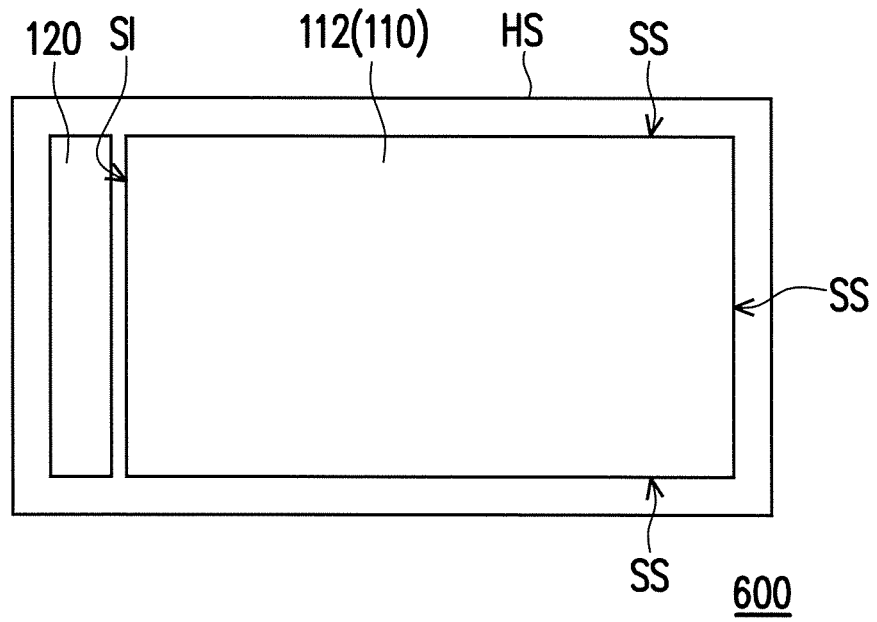
FIGS. 11 and 12 are top views illustrating a backlight module according to the sixth embodiment and seventh embodiment of the invention.
Figure 12:
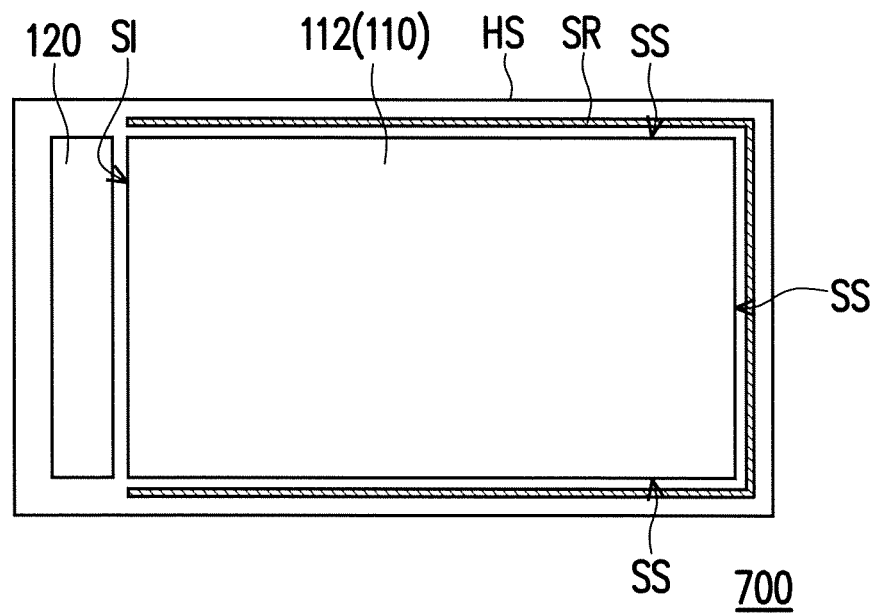

FIGS. 5 to 10 are incorporated to describe other implementations of the backlight module, wherein identical or similar elements are denoted by identical or similar reference numerals and no repetition is incorporated herein. FIGS. 5 to 8 are cross-sectional views illustrating a backlight module according to the second embodiment to the fifth embodiment of the invention. FIGS. 9 and 10 respectively show simulation results of the reflectivity of the backlight module under the condition where the light guide main body is only provided with the index matching layer and the condition where the light guide main body is provided with the index matching layer, first refractive index layer and second refractive index layer. FIGS. 11 and 12 are top views illustrating the backlight module according to the sixth embodiment and seventh embodiment of the invention, wherein the optical film 140 in FIG. 1 is omitted from FIGS. 11 and 12.

Figure 5:
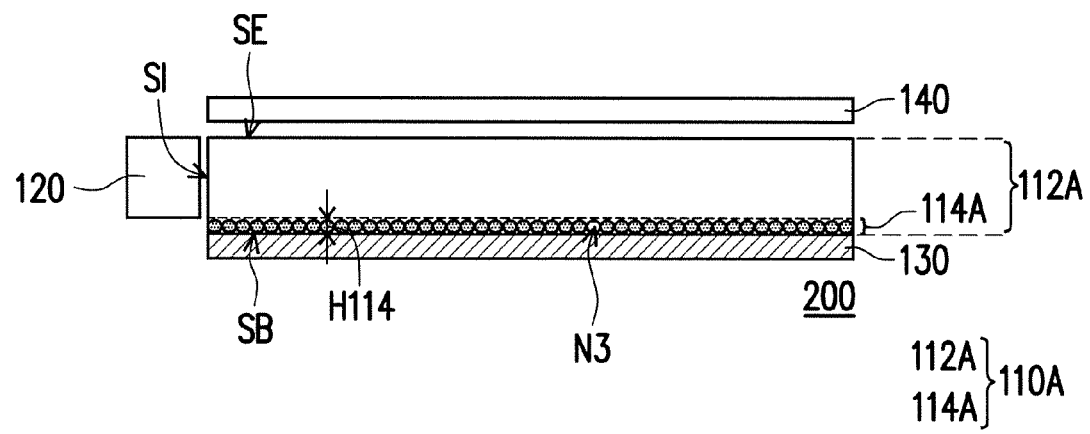
FIGS. 5 to 8 are cross-sectional views illustrating a backlight module according to the second embodiment to the fifth embodiment of the invention.

Referring to FIG. 5, a backlight module 200 is similar to the backlight module 100 in FIG. 1, and the main difference between them lies in a relative configuration relationship between an index matching layer 114A and a light guide main body 112A in a light guide plate 110A. Specifically, the index matching layer 114A is composed of a plurality of surface nano-holes N3 recessed into the light guide main body 112A from the bottom surface SB. The surface nano-holes N3 are, for example, formed by selectively etching the bottom surface SB of the light guide main body 112A, which should not be construed as a limitation to the invention. With this configuration, the light-emitting surface SE of the light guide main body 112A may be selectively formed with a plurality of light guide micro-structures, or the bottom surface SB of the light guide main body 112A may be formed with a plurality of dots.

Figure 6:
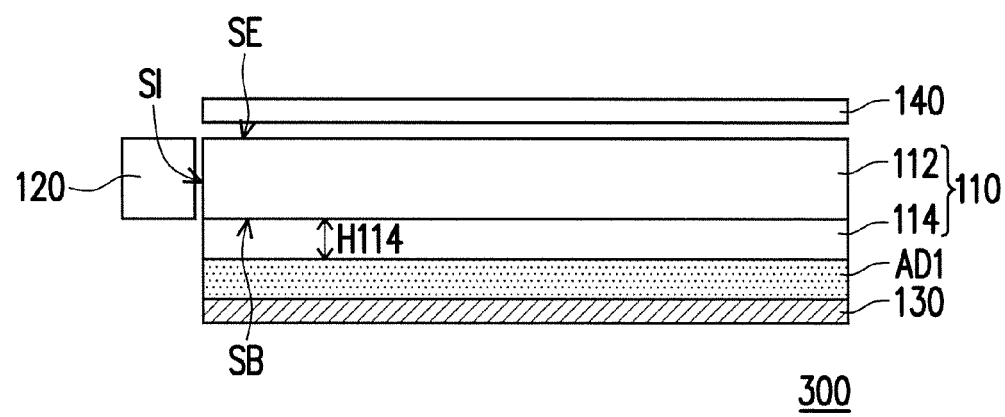

Referring to FIG. 6, a backlight module 300 is similar to the backlight module 100 in FIG. 1, and the main difference between them is that the backlight module 300 further includes an adhesive layer AD1, and the reflective sheet 130 is bonded to the index matching layer 114 via the adhesive layer AD1. The adhesive layer AD1 and the light guide main body 112 may have identical or similar refractive index, which should not be construed as a limitation to the invention. It should be pointed out that, in the embodiment of FIG. 5, the reflective sheet 130 may be bonded to the index matching layer 114 via the adhesive layer AD1.

Referring to FIG. 7, a backlight module 400 is similar to the backlight module 300 in FIG. 6, and the main difference between them is that an index matching layer 114B is glass that has surface nano-holes N3. The surface nano-holes N3 are, for example, formed by selectively etching one surface of the glass, which should not be construed as a limitation to the invention. The porosity of the index matching layer 114B may be in a range of 5% or more and 95% or less so that the refractive index of index matching layer 114B falls within the range of 1.1 to 1.45, which should not be construed as a limitation to the invention. The light guide plate 110B may further include an adhesive layer AD2, and the index matching layer 114B is bonded to the bottom surface SB via the adhesive layer AD2. The adhesive layers AD1 and AD2, the glass of the index matching layer 114B and the light guide main body 112 may have identical or similar refractive index, which should not be construed as a limitation to the invention. In addition, a thickness HAD2 of the adhesive layer AD2 and the thickness H114 of the index matching layer 114B may be smaller than the thickness H112 of the light guide main body 112.

In the embodiment, the surface nano-holes N3 are disposed at one side of the index matching layer 114B away from the light guide main body 112, which should not be construed as a limitation to the invention. In another embodiment, the surface nano-holes N3 may be disposed at one side of the index matching layer 114B close to the light guide main body 112. In addition, at least one of the bottom surface SB, the light-emitting surface SE of the light guide main body 112, the surface of the index matching layer 114B close to the light guide main body 112 and the surface of index matching layer 114B away from the light guide main body 112 may be selectively formed with a plurality of light guide micro-structures or a plurality of dots.

Referring to FIG. 8, a backlight module 500 is similar to the backlight module 100 in FIG. 1, and the main difference between them is that the backlight module 500 further includes at least one first refractive index layer I1 and at least one second refractive index layer I2. The refractive index of each second refractive index layer I2 is higher than the refractive index of each first refractive index layer I1. The at least one first refractive index layer I1 and the at least one second refractive index layer I2 are alternately disposed between the index matching layer 114 and reflective sheet 130, and wherein one of the at least one second refractive index layer I2 is closer to the index matching layer 114 than the at least one first refractive index layer I1. Specifically, when the number of the first refractive index layer I1 and second refractive index layer I2 is one, respectively, the second refractive index layer I2 is disposed between the first refractive index layer I1 and the index matching layer 114. When the number of the first refractive index layer I1 and the second refractive index layer I2 is plural, respectively, the second refractive index layer I2 and first refractive index layer I1 are alternately stacked in sequence in a direction indicating the reflective sheet 130 from the index matching layer 114.

When the material of the index matching layer 114 adopts a polymer material having viscosity, the first refractive index layer I1 and the second refractive index layer I2 may be formed on the reflective sheet 130 first and subsequently bonded to the light guide main body 112 via the index matching layer 114. Alternatively, the index matching layer 114, the second refractive index layer I2, the first refractive index layer I1 and the reflective sheet 130 may be formed in sequence on the light guide main body 112 (e.g. via the means of deposition).

In the embodiment, the index matching layer 114 not only can adopt the forms illustrated in FIG. 2A to FIG. 2C and FIG. 5, but also may be an air layer, that is, n2=1.0. With this configuration, the thickness H114 is equivalent to the height of the air gap between the second refractive index layer I2 and light guide main body 112.

By modulating the refractive indices and thickness HI1 and HI2 of the first refractive index layer I1 and the second refractive index layer I2, not only that the reflectivity difference between different wavelengths can be compensated, and the reflectivity can also be further improved. FIG. 9 and FIG. 10 are incorporated below to describe how the simulation result of reflectivity of backlight module is affected under the condition where the light guide main body 112 is only provided with the index matching layer 114 and the condition where the light guide main body 112 is provided with the index matching layer 114, the first refractive index layer I1 and the second refractive index layer I2. FIG. 9 shows the simulation result of reflectivity of backlight module under the configuration where the bottom surface SB of the light guide main body 112 is only provided with the index matching layer 114. FIG. 10 shows the simulation result of the reflectivity of backlight module under the configuration where the bottom surface SB of the light guide main body 112 is provided with the index matching layer 114, the first refractive index layer I1 and the second refractive index layer I2. In FIGS. 9 and 10, when the incident angle in the light guide main body 112 is greater than the critical angle (e.g. the incident angle is 60 degrees or 70 degrees), the reflectivity in the range of visible light (400 nm~700 nm) is nearly 100%. When the incident angle in the light guide main body 112 is smaller than critical angle (e.g. the incident angle is 0 degree, 20 degrees or 40 degrees), a portion of light beam is emitted from the bottom surface SB of the light guide main body 112, leading to loss of partial light energy. Therefore, the reflectivity in the range of visible light (400 nm~700 nm) is lower than 100%.

Comparing FIG. 9 with FIG. 10, under the configuration where the first refractive index layer I1 and the second refractive index layer I2 are not disposed, the overall reflectivity of the backlight module is lower. Apart from that, the reflectivity in the range of low wavelength (400 nm~550 nm) is apparently lower than the reflectivity in the range of long wavelength (550 nm~700 nm). Accordingly, the phenomenon of color shift is occurred. Under the configuration where the first refractive index layer I1 and the second refractive index layer I2 are disposed, by modulating the refractive indices and thickness HI1 and HI2 of the first refractive index layer I1 and the second refractive index layer I2, there is a more consistent reflectivity in the range of visible light wavelength (400 nm~700 nm), which not only can compensate for the reflectivity difference between different wavelengths, but also can enhance the overall reflectivity, thereby improving color shift and increase brightness of light emission of the backlight module 500. In the embodiment, the refractive index of each first refractive index layer I1 falls within a range of 1.3 to 1.5, and the refractive index of each second refractive index layer I2 falls within a range of 1.8 to 2.5. In addition, the thickness HI1 of each first refractive index layer I1 falls within a range of 50 nm to 100 nm, and the thickness HI2 of each second refractive index layer I2 falls within a range of 30 nm to 60 nm.

Referring to FIG. 9, a backlight module 600 is similar to the backlight module 100 in FIG. 1, and the main difference between them is that the backlight module 600 further includes a housing HS to accommodate the light guide plate 110, light source 120 and reflective sheet (not shown). In the embodiment, the housing HS may adopt materials having high reflectivity so as to reflect the light beam (not shown) emitted from a side surface SS of the light guide main body 112 back to the light guide main body 112, thereby enhancing utilization of light, which should not be construed as a limitation to the invention. As shown in FIG. 10, a backlight module 700 may further include a side reflective sheet SR to reflect the light beam emitted from the side surface SS of the light guide main body 112 back to the light guide main body 112. The side reflective sheet SR is disposed between the housing HS and the light guide plate 110. Accordingly, the material of the housing HS is not limited to the material having reflectivity.

In the above-mentioned embodiments, the backlight modules 100, 200, 300, 400, 500, 600 and 700 may be applied to a display apparatus (not shown). Specifically, the display apparatus may include one of the backlight modules 100, 200, 300, 400, 500, 600 and 700 and a display panel (not shown), wherein the display panel is disposed adjacent to the light emitting surface SE. For example, the display panel is disposed above the light emitting surface SE, and the optical film 140 is disposed between the light guide main body 112 and the display panel.

To summarize, the embodiments of the invention at least have one of the following advantages or effects. In the light guide plate in the embodiment of the invention, the cooperation between the refractive index difference between the light guide main body and index matching layer and the thickness of the index matching layer facilitates generation of total internal reflection. In one embodiment, the index matching layer may be used to support the light guide main body, thereby reinforcing the structural strength of the light guide plate. In addition, the backlight module in the embodiment of the invention uses the above-mentioned light guide plate and thus has good illumination quality. The display apparatus in the embodiment of the invention uses the above-mentioned backlight module and thus has good display quality. In one embodiment, the first refractive index layer and the second refractive index layer may be disposed between the index matching layer and the reflective sheet to compensate for the reflectivity difference between different wavelengths so as to increase reflectivity, thereby improving color shift and enhance brightness of light emission of the backlight module.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A light guide plate, comprising:
a light guide main body, comprising a light-emitting surface and a bottom surface opposite to the light-emitting surface;
an index matching layer, disposed adjacent to the bottom surface, wherein a refractive index of the light guide main body is n1, a refractive index of the index matching layer is n2, $1.07*n2 \leq n1 \leq 1.7*n2$, and $0.1 \leq (n1-n2) \leq 0.7$, a thickness of the index matching layer is greater than 500 nm; and
at least a first refractive index layer and at least a second refractive index layer, a refractive index of each of the second refractive index layer being higher than a refractive index of each of the first refractive index layer, the at least one first refractive index layer and the at least one second refractive index layer being alternately disposed below the index matching layer, and wherein one of the at least one second refractive index layer is closer to the index matching layer than the at least one first refractive index layer.

2. The light guide plate according to claim 1, wherein $1.5 \leq n1 \leq 1.7$, and $1.0 < n2 \leq 1.4$.

3. The light guide plate according to claim 1, wherein the bottom surface is disposed between the index matching layer and the light-emitting surface, the index matching layer comprises a plurality of nano-columnar voids or nano-holes.

4. The light guide plate according to claim 3, wherein a material of the index matching layer comprises an insulating material or a metal oxide.

5. The light guide plate according to claim 1, wherein the index matching layer is composed of a plurality of surface nano-holes recessed into the light guide main body from the bottom surface.

6. The light guide plate according to claim 1, wherein a porosity of the index matching layer is 5% or more and 95% or less.

7. The light guide plate according to claim 1, wherein the index matching layer is a glass having surface nano-holes, the light guide plate further comprises an adhesive layer, and the index matching layer is bonded to the bottom surface via the adhesive layer.

8. A backlight module, comprising:
a light guide plate, comprising:
a light guide main body, comprising a light-emitting surface, a bottom surface opposite to the light-emitting surface and a light-incident surface connecting the light-emitting surface and the bottom surface; and
an index matching layer, disposed adjacent to the bottom surface, wherein a refractive index of the light guide main body is n1, a refractive index of the index matching layer is n2, $1.07*n2 \leq n1 \leq 1.7*n2$, and $0.1 \leq (n1-n2) \leq 0.7$, a thickness of the index matching layer is greater than 500 nm;
a light source, disposed next to the light-incident surface;
a reflective sheet, wherein the index matching layer is disposed between the reflective sheet and the light guide main body; and
at least a first refractive index layer and at least a second refractive index layer, a refractive index of each of the second refractive index layer being higher than a refractive index of each of the first refractive index layer, the at least one first refractive index layer and the at least one second refractive index layer being alternately disposed between the index matching layer and the reflective sheet, and wherein one of the at least one second refractive index layer is closer to the index matching layer than the at least one first refractive index layer.

9. The backlight module according to claim 8, wherein $1.5 \leq n1 \leq 1.7$, and $1.0 \leq n2 \leq 1.4$.

10. The backlight module according to claim 8, wherein the bottom surface is disposed between the index matching layer and the light-emitting surface, the index matching layer comprises a plurality of nano-columnar voids or nano-holes.

11. The backlight module according to claim 10, wherein a material of the index matching layer comprises an insulating material or a metal oxide.

12. The backlight module according to claim 8, wherein the index matching layer is composed of a plurality of surface nano-holes recessed into the light guide main body from the bottom surface.

13. The backlight module according to claim 8, wherein a porosity of the index matching layer is 5% or more and 95% or less.

14. The backlight module according to claim 8, further comprising an adhesive layer, the reflective sheet being bonded to the index matching layer via the adhesive layer.

15. The backlight module according to claim 8, wherein the index matching layer is a glass having surface nano-holes, the light guide plate further comprises an adhesive layer, the index matching layer is bonded to the bottom surface via the adhesive layer.

16. The backlight module according to claim 8, wherein the refractive index of each of the first refractive index layer falls within a range of 1.3 to 1.5, and the refractive index of each of the second refractive index layer falls within a range of 1.8 to 2.5.

17. The backlight module according to claim 8, wherein a thickness of each of the first refractive index layer falls within a range of 50 nm to 100 nm, and a thickness of each of the second refractive index layer falls within a range of 30 nm to 60 nm.

18. The backlight module according to claim 8, further comprising a housing for accommodating the light guide plate, the light source and the reflective sheet.

19. The backlight module according to claim 16, further comprising a side reflective sheet disposed between the housing and the light guide plate.

20. A display device, comprising:
the backlight module according to claim 8; and
a display panel, wherein the display panel is disposed adjacent to the light-emitting surface.

* * * * *